United States Patent
Papadimitriou et al.

(10) Patent No.: US 7,333,575 B2
(45) Date of Patent: Feb. 19, 2008

(54) METHOD AND APPARATUS FOR RECEIVING A CDMA SIGNAL

(75) Inventors: Panayiotis D. Papadimitriou, Irving, TX (US); Prabodh Varshney, Coppell, TX (US)

(73) Assignee: Nokia Corporation, Espoo (FI)

( * ) Notice: Subject to any disclaimer, the term of this patent is extended or adjusted under 35 U.S.C. 154(b) by 434 days.

(21) Appl. No.: 10/729,422

(22) Filed: Dec. 5, 2003

(65) Prior Publication Data
US 2004/0176051 A1    Sep. 9, 2004

Related U.S. Application Data

(63) Continuation-in-part of application No. 10/395,831, filed on Mar. 24, 2003.

(60) Provisional application No. 60/452,870, filed on Mar. 6, 2003.

(51) Int. Cl.
H04B 7/10 (2006.01)
H04L 1/02 (2006.01)

(52) U.S. Cl. ............... 375/347; 375/348; 375/349; 375/350; 375/147; 455/101; 370/335; 370/342

(58) Field of Classification Search ............... 375/346, 375/347, 147, 148, 142, 144, 335, 342, 279, 375/441, 343; 370/342, 343, 279, 441
See application file for complete search history.

(56) References Cited

U.S. PATENT DOCUMENTS

| | | | |
|---|---|---|---|
| 6,278,732 B1 | 8/2001 | Beidas et al. | |
| 6,519,477 B1 | 2/2003 | Baier et al. | |
| 6,526,103 B1 | 2/2003 | Li et al. | |
| 6,570,864 B1* | 5/2003 | Kim et al. | 370/342 |
| 6,748,024 B2* | 6/2004 | Kuchi et al. | 375/299 |
| 6,754,253 B2* | 6/2004 | Guey | 375/148 |
| 6,775,260 B1* | 8/2004 | Dabak et al. | 370/342 |
| 6,975,666 B2* | 12/2005 | Affes et al. | 375/130 |
| 7,023,903 B2* | 4/2006 | Karna | 375/147 |
| 7,024,166 B2* | 4/2006 | Wallace et al. | 455/101 |
| 2003/0053526 A1* | 3/2003 | Reznik | 375/148 |

(Continued)

OTHER PUBLICATIONS

Rezaaifar et al., "Multi-Stage Detection Scheme for CDMA System," IEEE 1997, pp. 474-477.*

(Continued)

*Primary Examiner*—Mohammed Ghayour
*Assistant Examiner*—Qutub Ghulamali
(74) *Attorney, Agent, or Firm*—Alston & Bird LLP

(57) ABSTRACT

A receiver, a system, and an associated method, for receiving a radio signal carrying transmitted data that is subject to distortion in the transmission channel. The receiver includes a plurality of stages that perform parallel interference cancellation (PIC) with respect to a received space-time transmit diversity (STTD) signal to establish successively more accurate estimates of the transmitted data, including a receiver first stage being a RAKE-STTD receiver, a second stage including an minimum mean-square error (LMMSE) equalizer, and preferably a third stage also including an LMMSE. Each stage processes the estimates of the transmitted signal provided by the stage preceding it, as well as the received signal, to mitigate or eliminate as much transmission-channel interference as possible and provide a refined estimate for processing by subsequent stages. Improved channel estimation may be achieved by processing the pilot signal in similar fashion as well.

17 Claims, 7 Drawing Sheets

U.S. PATENT DOCUMENTS

2004/0120299 A1* 6/2004 Kidiyarova-Shevchenko et al. ............. 370/342
2005/0002445 A1* 1/2005 Dunyak et al. ............. 375/148

OTHER PUBLICATIONS

Mahesh et al., "Multistage Detection in Asynchronous Code-Division Multiple-Access Communication," IEEE Transaction on Comm., 1990, pp. 509-519.*

Xue, Guoqiang et al., "Adaptive Multistage Parallel Interference Cancellation for CDMA," IEEE Journal on Selected Areas in Communications, vol. 17, No. 10, pp. 1251-1255, Oct. 1999.*

Lin, et al., A Novel Multiuser Detection Scheme Combining Adaptive MMSE Receiver And Parallel Interference Canceller For Near-Far Resistance, IEEE, Aug. 20, 2002, 119-122.

Host-Madsen, et al., MMSE/PIC Multiuser Detection for DS/CDMA Systems With Inter- And Intra-Cell Interface, IEEE Transactions On Communications, Aug. 2, 1999, 291-299, 47, No.

Cruickshank, Suppression of Multiple Access Interference In A DS-CDMA System Using Wiener Filtering And Parallel Cancellation, IEE Proc.-Commun., Aug. 8, 1996, 226-230, 143, 4.

* cited by examiner

METHOD AND APPARATUS FOR RECEIVING A CDMA SIGNAL

CLAIM OF BENEFIT OF PROVISIONAL AND PARENT APPLICATION

This Application is a CIP of U.S. application Ser. No. 10/395,831, filed 24 Mar. 2003 and claims the benefit of the filing date of U.S. Provisional Application No. 60/452,870, filed Mar. 6, 2003.

FIELD OF THE INVENTION

The present invention relates generally to radio telephony, and more specifically to a method and apparatus for receiving and processing a radio signal that is subject to transmission-channel distortion.

BACKGROUND OF THE INVENTION

Radio telephones, commonly called cellular (or "cell") phones, have become ubiquitous in recent years. Formerly the domain of the wealthy, or those in specialized professions for whom the great expense then associated with them was justified, radio telephones are now used by a majority of the population in this country and in many other regions around the world. Considerable leaps in technology have contributed significantly to this evolution. These advances have not only made radio telephone service available to many subscribers at a reasonable price, but they have also permitted great increases in the capacity of the communication networks providing the service.

The cell phone is so called because it is designed to operate within a cellular network. Such a network has infrastructure that switches and routes calls to and from network subscribers who are using portable radio devices. Rather than having one or two antennas to handle all of this radio traffic, however, the cellular network is divided into a great many smaller areas, or "cells", each having an antenna of their own. A cellular wireless system has several advantages over a central antenna system. As the cells are much smaller than the large geographic area covered by a central antenna, transmitters do not need as much power. This is particularly important where the transmitter is housed in a small device such as a cell phone. In addition, the use of low-power transmitters means that although the number of them operating in any one cell is still limited, the cells are small enough that a great many may operate in an area the size of a major city. The mobile stations do not transmit with enough power to interfere with others operating in other cells, or at least those cells that are not adjoining. In some networks, this enables frequency reuse, that is, the same communication frequencies can be used in non-adjacent cells at the same time without interference. This permits the addition of a larger number of network subscribers. In other systems, codes used for privacy or signal processing may be reused in a similar manner.

At this point, it should also be noted that as the terms for radio telephones, such as "cellular (or cell) phone" and "mobile phone" are often used interchangeably, they will be treated as equivalent herein. Both, however, are a sub-group of a larger family of devices that also includes, for example, certain computers and personal digital assistants (PDAs) that are also capable of wireless radio communication in a radio network. This family of devices will for convenience be referred to as "mobile stations" (regardless of whether a particular device is actually moved about in normal operation).

In addition to the cellular architecture itself, certain multiple access schemes may also be employed to increase the number of mobile stations that may operate at the same time in a given area. In frequency-division multiple access (FDMA), the available transmission bandwidth is divided into a number of channels, each for use by a different caller (or for a different non-traffic use). Time-division multiple access (TDMA) improves upon the FDMA scheme by dividing each frequency channel into time slots. Any given call is assigned one or more of these time slots on which to send information. More than one voice caller may therefore use each frequency channel. Code-division multiple access (CDMA) operates by spreading and encoding transmissions. By encoding each transmission in a different way, each receiver (i.e. mobile station) decodes only information intended for it and ignores other transmissions.

The number of CDMA mobile stations that can operate in a given area is therefore limited by the number of encoding sequences available, rather than the number of frequency bands. The operation of a CDMA network is normally performed in accordance with a protocol referred to as IS-95 (interim standard-95) or, increasingly, according to its third generation (3G) successors, such as those sometimes referred to as 1xEV-DO and 1xEV-DV, the latter of which provides for the transport of both data and voice information.

A wireless network using any of these schemes employs a certain basic structure such as the one illustrated in FIG. 1. FIG. 1 is a simplified block diagram illustrating selected components of a wireless transmission system 100. Wireless transmission system 100 includes a transmit side 105 and a receive side 155. This illustration implies that the two sides are located in different terminals that are attempting to communicate with each other, although typically a communication terminal will include both transmit and receive functions.

The information to be transmitted, which may be voice or data information, is first provided to an encoder 110 to be encoded into digital form. Note that the terms 'data' and 'information' may be used interchangeably herein. No formal distinction is thereby intended unless it is specifically stated or apparent from the context. The encoded information is then mapped to symbols in a modulator 120 and provided to transmitter 130, where it is modulated onto a carrier wave and amplified for transmission via radio channel 150 through antenna 140.

The receiver 170 receives the transmitted radio frequency (RF) signal x through antenna 160. The received signal y is processed by the receiver 170 provides and the result $\hat{d}$ to a demodulator 180, which recovers the encoded sequence $\hat{u}$ (as well as it is able) taking into account the characteristics h of channel 150. This encoded sequence $\hat{u}$ is provided to a decoder 190 for replication of the originally transmitted information. As should be apparent, the goal of any such communication system is the faithful reproduction of this information.

There are a number of obstacles, however, to reliable and effective transmission of information over the air interface. One of the most significant is multipath fading. Transmitted radio signals, generally speaking, spread out as they propagate, and different portions of the signal may reflect off or be otherwise impeded by the various objects each portion encounters. The result is that the different portions of same signal take different paths to the receiver and therefore arrive at slightly different times. These different portions may then interfere with each other and cause fading.

One manner of addressing this challenge is through the use of transmission diversity, for example time diversity or space diversity. Time diversity involves introducing time-delayed redundancy into the transmitted data and, where the fading is time variant, allows the receiver to more accurately recover the transmitted information. Spatial diversity may also be used. In spatial diversity more than one transmission antenna is used, the antennas being spaced apart at a distance selected to provide a desired level of correlation between the data transmitted by each of the antennas. A combination of these two types of transmit diversity may be referred to as space-time transmit diversity (STTD).

The present invention is a receiver, a system, and a method for utilizing STTD transmitted signals and is of particular advantage when applied to a third-generation CDMA network, for example one operating according to the 1xEV-DV protocol.

SUMMARY OF THE INVENTION

The present invention is directed to the reception of data in radio signals transmitted in a network that employs space-time transmit diversity (STTD). In one aspect, the present invention is a receiver for receiving an STTD transmitted signal including a RAKE-STTD receiver as a first stage of the receiver for receiving and processing the STTD signal and at least a second stage receiver. The second stage receiver performs STTD parallel interference cancellation (STTD-PIC) using the output of the first stage and the received signal as its input, and produces a refined estimate of the transmitted data. The second state preferably includes an STTD-linear minimum mean square error (LMMSE) receiver that is used to process the refined estimate before it is output. The receiver may also include a third stage including an STTD-PIC and an STTD-LMMSE for further processing the output of the second stage to produce a further refined estimate. Stages subsequent to the RAKE-STTD may also process the received signal itself to produce an improved channel estimate.

In another aspect, the present invention is a system for communicating data via radio signals including an STTD transmitter and an STTD-signal receiver having at least one antenna, the receiver including a first stage RAKE-STTD for receiving the radio signals and a STTD-PIC second stage for receiving the output of the RAKE-STTD and further processing it to produced a refined estimate of the transmitted data. The second stage may also include an STTD-LMMSE. The receiver of the system may also include a plurality of antennas to increase the diversity gain.

In yet another aspect, the present invention is a method of receiving a data-bearing radio signal that has been transmitted using STTD including the steps of receiving indications of the received radio signal in a first stage RAKE-STTD receiver and processing the signal in the first stage to produce an estimate of the transmitted data as output, receiving as input in a second stage of the receiver the output of the first stage, and the original received signal as well, and processing the input received in the second stage to produce a refined estimate of the data as output.

DETAILED DESCRIPTION

FIGS. 1 through 7, discussed herein, and the various embodiments used to describe the present invention are by way of illustration only, and should not be construed to limit the scope of the invention. Those skilled in the art will understand the principles of the present invention may be implemented in any similar radio-communication device, in addition to those specifically discussed herein.

Figure 1:
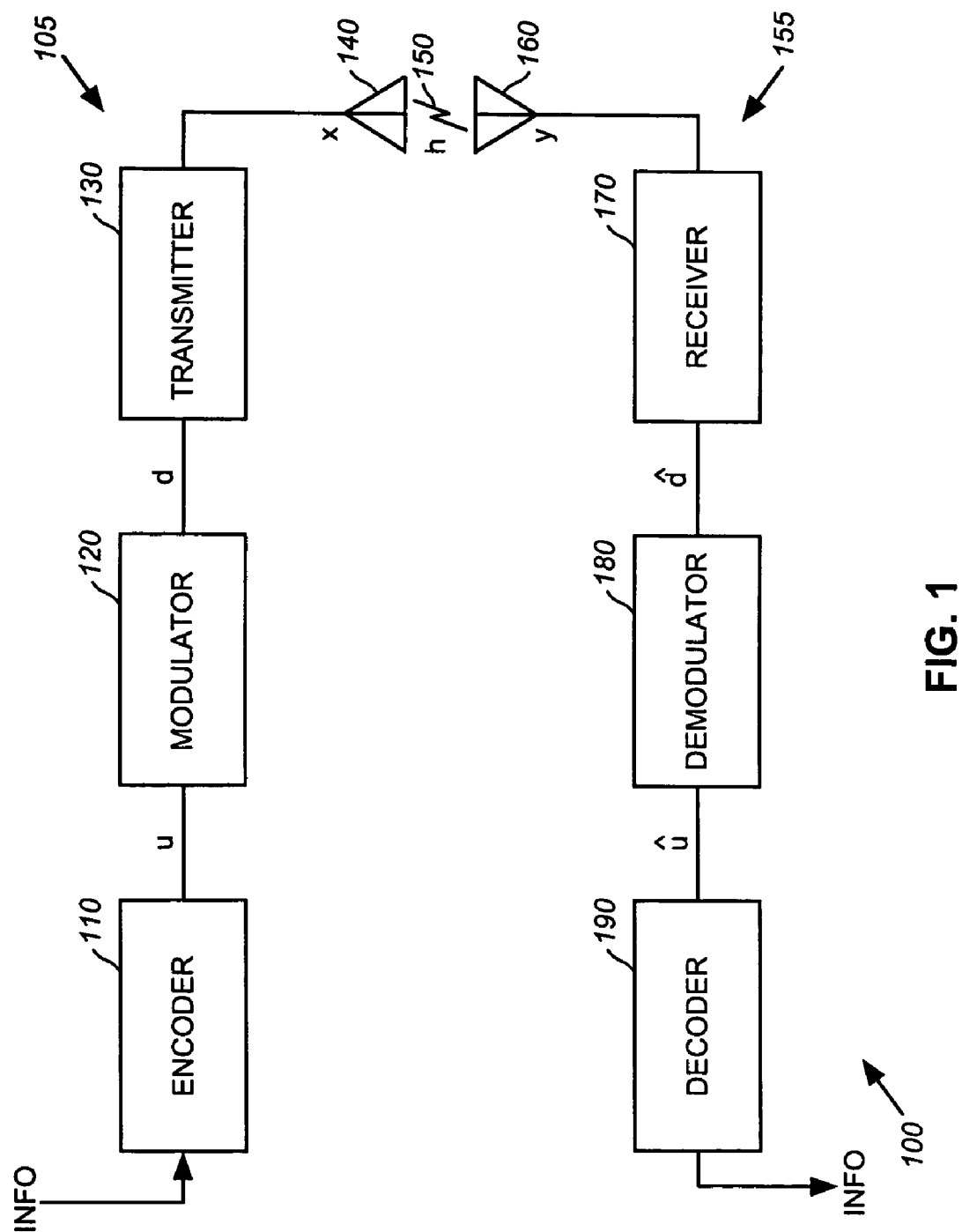
FIG. 1 is a simplified functional block diagram illustrating selected components of a wireless transmission system.
Figure 2:
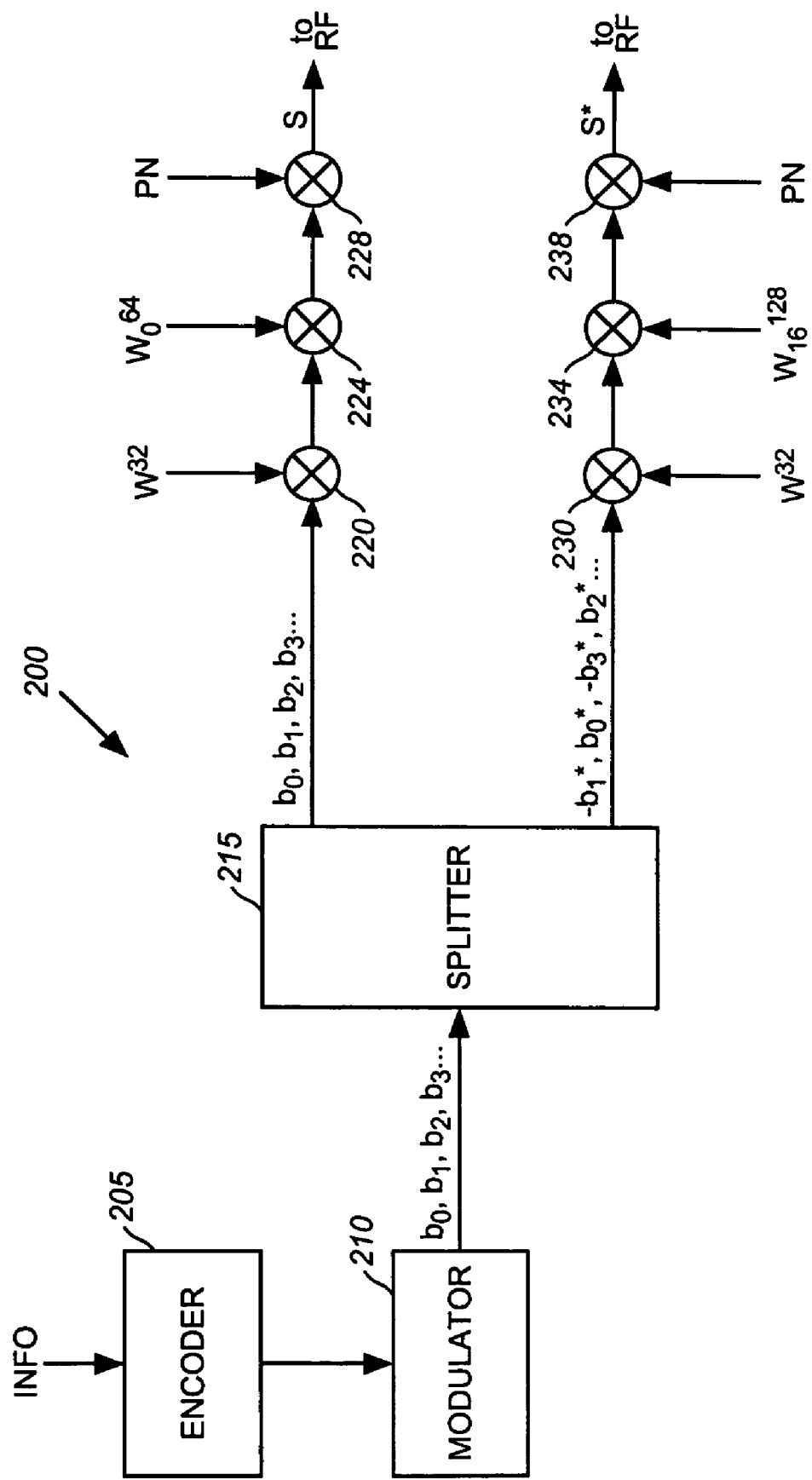
FIG. 2 is a functional block diagram illustrating selected components that may be used on the transmit side of a system employing STTD according to an embodiment of the present invention.

The present invention presents an innovative design for a hybrid radio receiver that may be used, for example, in a code division multiple access (CDMA) telecommunication system that employs space-time transmit diversity (STTD). As mentioned above, STTD is in many systems an effective way to combat the effects of multipath distortion. FIG. 2 is a functional block diagram illustrating selected components that may be used on the transmit side 200 of a system employing STTD according to an embodiment of the present invention. Naturally, the selected transmission components 200 are arranged with the intent of sending a signal to a compatible receiver (not shown in FIG. 2), such as one operable according to an embodiment of the present invention.

The information (data) to be transmitted is provided to encoder 205, and the encoded information is then provided to modulator 210. In order to achieve transmit diversity, the modulated bit stream $b_0, b_1, b_2, b_3, \ldots$ is provided to splitter 215 where it is split into two streams: $b_0, b_1, b_2, b_3, \ldots$ and $-b_1^*, b_0^*, -b_3^*, b_2^*, \ldots$ (where "*" denotes a complex conjugate). Each of these streams is then spread with respect to time using a spreading code $W_{32}$, such as a Walsh-Hadamard code (length 32), by multiplier 220 and multiplier 230, respectively. Pilot signals are added to the spread signal in adders 224 and 234, respectively, then a pseudonoise (PN) code is applied to each stream in respective multipliers 228 and 238 to create two multi-coded spread sequences represented in FIG. 2 by the vectors s and s*.

Figure 3:
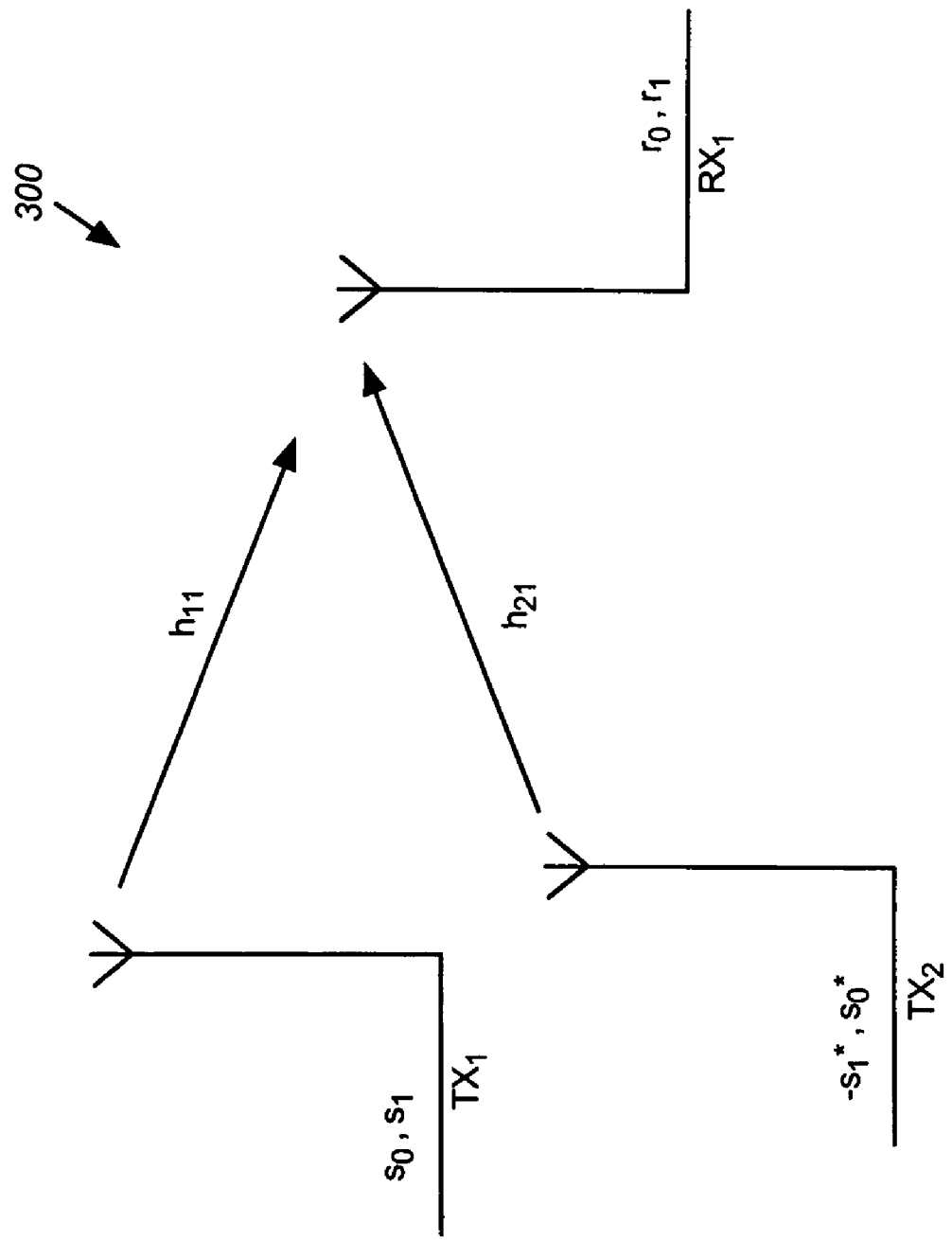
FIG. 3 is a simplified schematic drawing illustrating the antenna configuration of a telecommunication system utilizing transmit diversity for operating according to an embodiment of the present invention.

FIG. 3 is a simplified schematic drawing illustrating the antenna configuration of a telecommunication system 300 utilizing transmit diversity for operating according to an embodiment of the present invention. Transmit antenna $TX_1$ and transmit antenna $TX_2$ are both transmitting different forms of the same information for reception by receive antenna $RX_1$. In FIG. 3, the information being transmitted from antenna $TX_1$ is designated as signals $s_0, s_1$, and the information transmitted from antenna $TX_2$ as signals $-s_1^*, s_0^*$. Transmit antennas $TX_1$ and $TX_2$ are typically present in the same physical device, for example a wireless network base station, and may form a transmit station as described above in relation to FIG. 2. Receiver $RX_1$, of course, will typically be part of another wireless communication device such as a mobile station. The configuration of FIG. 3 is said to exhibit 2-1 diversity in reference to the number of transmit and receive antennas. Note, however, that for a given transmission there may be any number of intended receiving stations (each having its own antenna). In other words, 2-1 diversity may be used to send broadcast or multicast transmissions, in addition to those intended for a single recipient.

Each combination of transmit antenna and receive antenna defines a channel, and therefore in the embodiment of FIG. 3 there are two, designated $h_{11}$ and $h_{21}$. Presuming that antenna $TX_1$ transmits signal $s_0$ at time t and $s_1$ at time t+T, where T is the symbol period, and that antenna $TX_2$ transmits signal $-s_1^*$ at time t and $s_0^*$ at t+T, then the signals $r_0$ and $r_1$ received at receive antenna $RX_1$ may be characterized as:

$$r_0 = h_{11} s_0 - h_{21} s_1^* + n_0 \text{ and}$$

$$r_1 = h_{11} s_1 + h_{21} s_0^* + n_1,$$

where $n_0$ and $n_1$ represent the additive noise at times t and t+T, respectively.

This configuration achieves a diversity order of 2 utilizing a single receive antenna. The STTD-transmitted signals so and si may be decoded (estimated) using the following linear operations:

$$\tilde{s}_0 = h^*_{11} r_0 + h_{21} r_1^* = (|h_{11}|^2 + |h_{21}|^2) s_0 + n$$

$$\tilde{s}_1 = -h_{21} r_0^* + h_{11}^* r_1 = (|h_{11}|^2 + |h_{21}|^2) s_1 + n'$$

where n and n' are noise terms.

Figure 4:
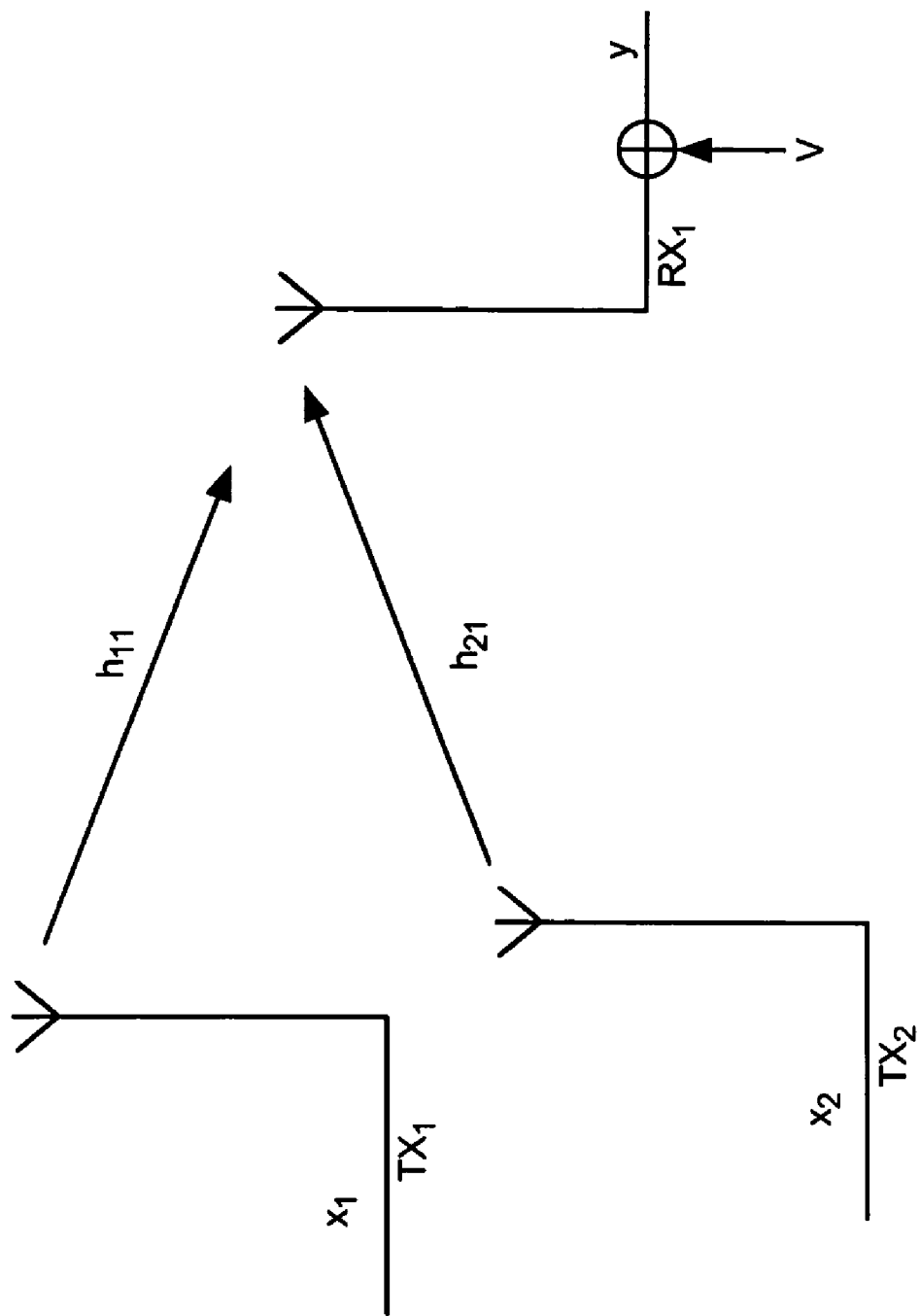
FIG. 4 is a simplified schematic drawing illustrating the 2-1 diversity transmit antenna diversity configuration of FIG. 3.

FIG. 4 is a simplified schematic drawing illustrating the 2-1 diversity transmit antenna diversity configuration 300 of FIG. 3, except that for simplicity the STTD transmitted signals $s_0$, $s_1$ are generally represented as $x_1$ and the signals $-s_1^*$, $s_0^*$ are represented as $x_2$. Correspondingly, the received signal $r_0$, $r_1$ are together represented as y and the additive noise v. Note, however, that although only two signals were illustrated in FIG. 3, the vectors x and y could represent any number of signals.

Using this notation, the received signal y may be represented as:

$$y = [H_{11} H_{21}] \begin{bmatrix} x_1 \\ x_2 \end{bmatrix} + v$$

where $y = [y_{n+F}, y_{n+F-1}, \ldots y_n]^T$, with n being the chip index, and F+1 the number of filter (chip equalizer) taps per transmit antenna. In this equation, the transmitted signal vector of size (F+1+L) for the first antenna is $x_1 = [x_{1,n+F}, x_{1,n+F-1}, \ldots, x_{1,n}, \ldots x_{1,n-L}]^T$ (and likewise for the second antenna). Further, $v = [v_{n+F}, v_{n+F-1}, \ldots v_n]^T$, and represents the additive noise sequence of autocorrelation matrix $R_{vv}$.

$H_{11}$, $H_{21}$ are Sylvester matrices of size (F+1)×(F+1+L) containing shifted versions of the corresponding overall channel impulse responses, where $h_{j1} = [h_{j1,0}, h_{j1}, \ldots h_{j1,L}]^T$ for j=1, 2.

$$H_{11} = \begin{bmatrix} h_{11,0} & h_{11,1} & \cdots & H_{11,L} & 0 & \cdots & 0 \\ 0 & h_{11,0} & h_{11,1} & \cdots & h_{11,L} & \ddots & \vdots \\ \vdots & \ddots & \ddots & & & \ddots & 0 \\ 0 & \cdots & 0 & h_{11,0} & h_{11,1} & \cdots & h_{11,L} \end{bmatrix}, \text{ and}$$

$$H_{21} = \begin{bmatrix} h_{21,0} & h_{21,1} & \cdots & H_{21,L} & 0 & \cdots & 0 \\ 0 & h_{21,0} & h_{21,1} & \cdots & h_{21,L} & \ddots & \vdots \\ \vdots & \ddots & \ddots & & & \ddots & 0 \\ 0 & \cdots & 0 & h_{21,0} & h_{21,1} & \cdots & h_{21,L} \end{bmatrix}.$$

Letting $H = [H_{11} H_{21}]$ and $$x = \begin{bmatrix} x_1 \\ x_2 \end{bmatrix}, y$$

can also be expressed $y = Hx + v$.

Figure 5:
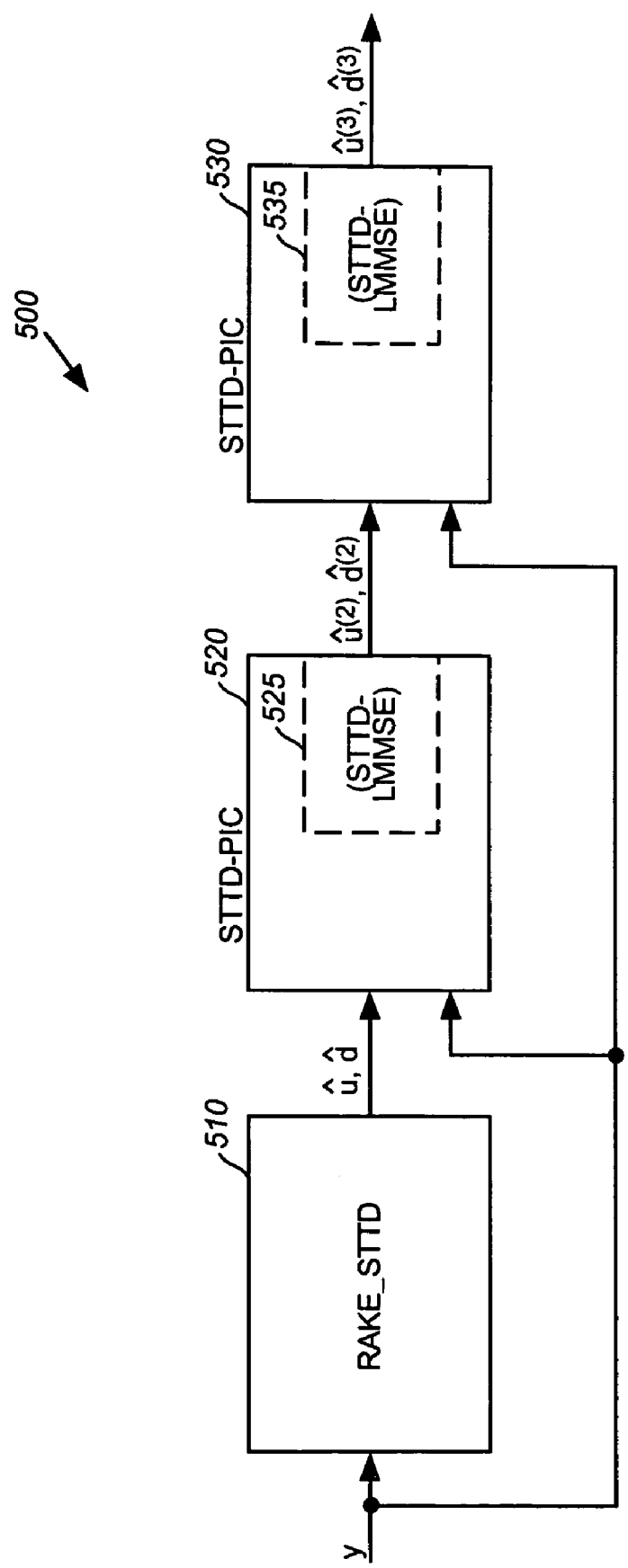
FIG. 5 is a functional block diagram illustrating selected components of a receiver 500 according to an embodiment of the present invention

On the receive side of the transmission, the transmitted STTD signals are received and processed. FIG. 5 is a functional block diagram illustrating selected components of a receiver 500 according to an embodiment of the present invention. Receiver 500 includes an STTD-RAKE receiver as a first-stage 510 that processes incoming signal y as described above, and outputs estimated encoded bits û and/or symbols â. Note that CDMA devices commonly employ RAKE receivers to combat multipath fading.

The basic principle of the RAKE receiver involves selecting a limited number of individual paths of the transmitted signal. The time-delay between different paths arises because the signal is traveling from the transmitter to the receiver. Each selected path is provided to a different RAKE "finger".

In operation, each finger of the RAKE-STTD receiver (not shown individually) uses a time-aligner to compensate for the path delay. The pilot PN quadrature spreading is then removed and the characteristics of the transmission channel are estimated using the pilot channels. A code such as a 32-length Walsh-Hadamard code (assuming the same having been employed in the transmitter) is used to despread the received signal, and then the STTD-transmitted signal is decoded as described above. The decoded results of all fingers are then combined and passed to the demodulator to yield the RAKE-STTD output represented in FIG. 5 as û, â. Estimated data û, â is provided to second stage 520.

The second stage 520 of receiver 500 is a first STTD-PIC, which then operates to refine the estimate as follows. Using K to represent the number of active spreading codes (except those used for the pilot channels), and $\mathcal{H}_{11}$ and $\mathcal{H}_{21}$ represent the overall channel impulse response between each respective transmit antenna and the receive antenna (see, for example, FIG. 3). The overall channel impulse response is represented by a Sylvester matrix $\mathcal{H} = [\mathcal{H}_{11}, \mathcal{H}_{21}]$. Then, setting j=1, $\hat{x}_j = [\hat{x}_{1,j}^T, \hat{x}_{2,j}^T]_T$ is used to represent the reconstructed chip signal of a whole transmitted frame from both antennas, based on decisions of the previous stage, of all the active spreading codes of the system (including the pilot)— except the $j^{th}$ spreading code. The multiuser interference "seen" by the $j^{th}$ spreading code is $\mathcal{H}\hat{x}_j$ where $\mathcal{H}$ is defined over the entire frame. The PIC of second stage 520 then subtracts this interference from the received chip vector y to produce (ideally) an interference-free signal for the $j^{th}$ spreading code. This signal, which may be represented as $y - \mathcal{H}\hat{x}_j$, is then passed through an STTD-LMMSE receiver 525 incorporated as part of second stage 520 to yield the symbol estimates for the $j^{th}$ code for the next stage.

The STTD-LMMSE (linear minimum mean square error) receiver is an LMMSE chip equalizer filter followed by a bank of matched filters, which in turn is followed by a decision device. An LMMSE chip equalizer filter seeks to minimize the mean-squared error between its output and the transmitted chip sequence $x_n$ (n being the chip index). In this embodiment, the STTD-LMMSE will try to detect the two transmitted streams ($x_1$ and $x_2$), and it is the solution to the minimization:

$W_{LMMSE} = \arg \min_{\mathcal{H}} E\{\|w^H y - x_n\|^2\}$, where w is the (F+1)×2 filter to be found and $$x_n = \begin{bmatrix} x_{1,n} \\ x_{2,n} \end{bmatrix}.$$

Minimization of this quantity will lead to $R_{yy} W_{LMMSE} = R_{yx}$ where $R_{yy} \equiv E\{yy^H\} = HR_{xx}H^H + R_{vv}$. ($R_{vv}$ is the noise process correlation matrix.) And finally $R_{yx} \equiv E\{yx_n^*\} = HE\{xx_n^H\} = \sigma_x^2 \tilde{h}_F$ where the autocorrelation of the transmitted signal is assumed:

$R_{xx} = \sigma_x^2 I$, $\tilde{h}_F$ is an (F+1)×2 matrix whose first and second columns are the $F^{th}$ columns of $H_{11}$ and $H_{21}$ (shown above), respectively (counting starts from 0). Assuming that the transmitted signal is independent of the additive noise, this yields:

$$w_{LMMSE} = \left( HH^H + \frac{1}{\sigma_x^2} R_{vv} \right)^{-1} \tilde{h}_F.$$

Naturally, the process described above is repeated with respect to each j=2, 3, . . . K, where K is the number of active spreading codes (a user may have an assigned one, or multiple codes). The symbol estimates and the bit estimates of all users are denoted $\hat{d}^{(2)}$, $\hat{u}^{(2)}$, respectively and are passed to the third stage 530 of receiver 500. Third stage 530 is also an STTD-PIC incorporating an STTD-LMMSE 535, and performs an operation similar to that described above with reference to the (first STTD-PIC of) second stage 520, but using its input $\hat{d}^{(2)}$, $\hat{u}^{(2)}$ and y to produce a further refined data estimate $\hat{u}^{(3)}$, $\hat{d}^{(3)}$. Bit or symbol estimates $\hat{u}^{(3)}$, $\hat{d}^{(3)}$ may be provided to a decoder (not shown), or may be subjected to further refinement in one or more additional STTD-PIC stages (also not shown).

In a particularly advantageous embodiment of the present invention, stages that include a PIC receiver can apply parallel interference cancellation to the pilot signal (or signals) for each transmit antenna, in an analogous fashion to that used for user symbols. This alternative may significantly improve channel estimation.

Figure 6:
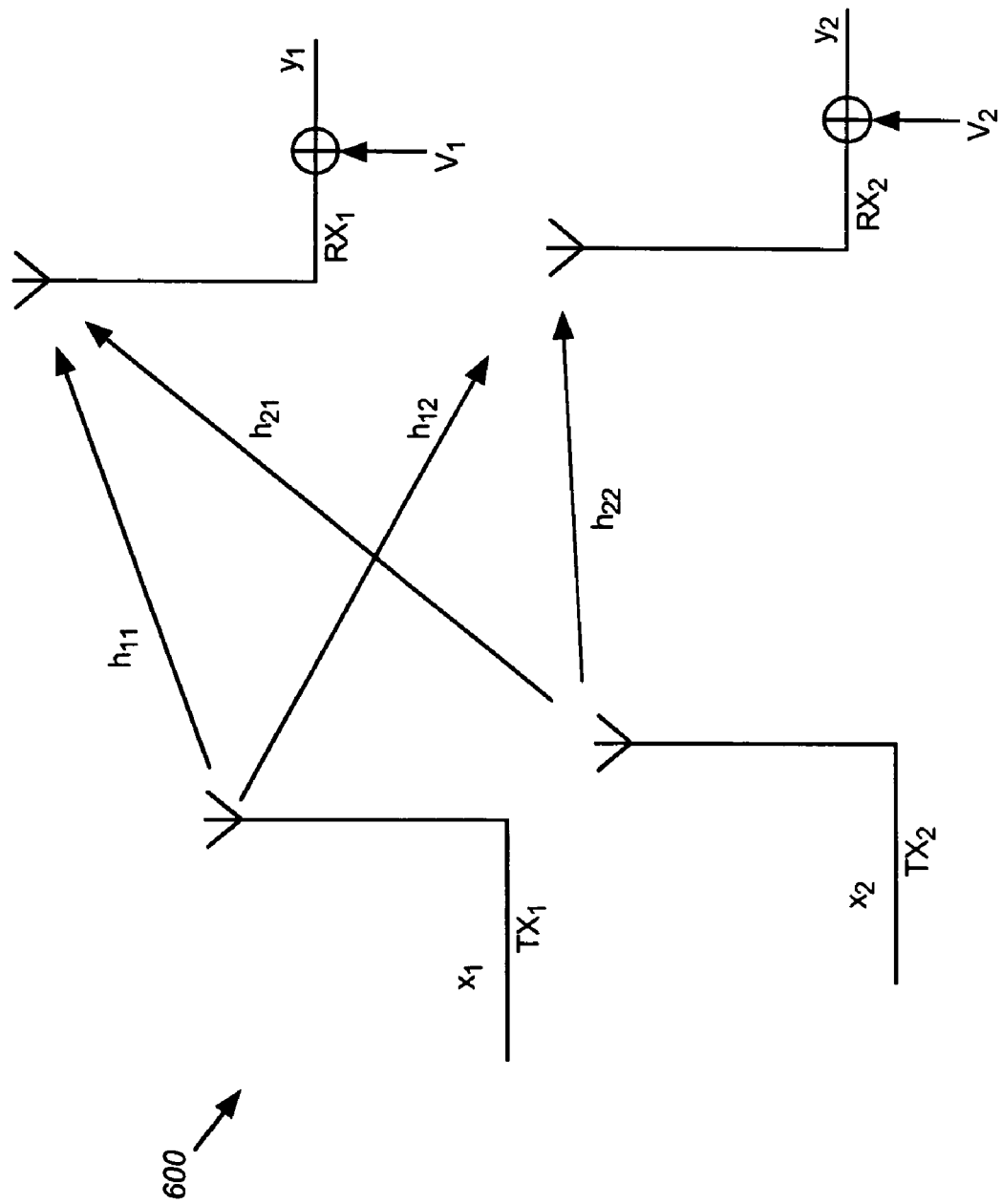
FIG. 6 is a simplified schematic drawing illustrating the antenna configuration of a telecommunication system utilizing both transmit and receive diversity according to an embodiment of the present invention.

In another embodiment, the system may also employ receive diversity. FIG. 6 is a simplified schematic drawing illustrating the antenna configuration of a telecommunication system 600 utilizing both transmit and receive diversity according to an embodiment of the present invention. Similar to the embodiment of FIG. 4, transmit antenna $TX_1$ and transmit antenna $TX_2$ are used to achieve transmit diversity for the transmitted signals. In the embodiment of FIG. 6, however, each of the each of these transmissions is received by both receive antennas $RX_1$ and $RX_2$, creating four separate transmission channels represented as $h_{11}$, $h_{12}$, $h_{21}$, and $h_{22}$. This configuration is said to exhibit 2-2 diversity.

Note that in contrast to the system of FIG. 4, the two receivers $RX_1$ and $RX_2$ are normally located at the same device. There may be many such devices, of course, each receiving the same signal. In one embodiment of the present invention, the transmit diversity signal may be received and processed by devices having a single receive antenna as well as by devices having two (or more) receive antennas.

In the embodiment of FIG. 6, the signals transmitted by antennas $TX_1$ and $TX_2$ are represented as $x_1$ and $x_2$, respectively. The combined signal received at receiver $RX_1$ (including additive noise $v_1$) is represented as $y_1$, and the combined signal received at antenna $RX_2$ (plus noise $v_2$) as $y_2$. In this case, the received signal y is represented as:

$$y = \begin{bmatrix} y_1 \\ y_2 \end{bmatrix} = \begin{bmatrix} H_{11} & H_{21} \\ H_{12} & H_{22} \end{bmatrix} \begin{bmatrix} x_1 \\ x_2 \end{bmatrix} + \begin{bmatrix} v_1 \\ v_2 \end{bmatrix}$$

Figure 7:
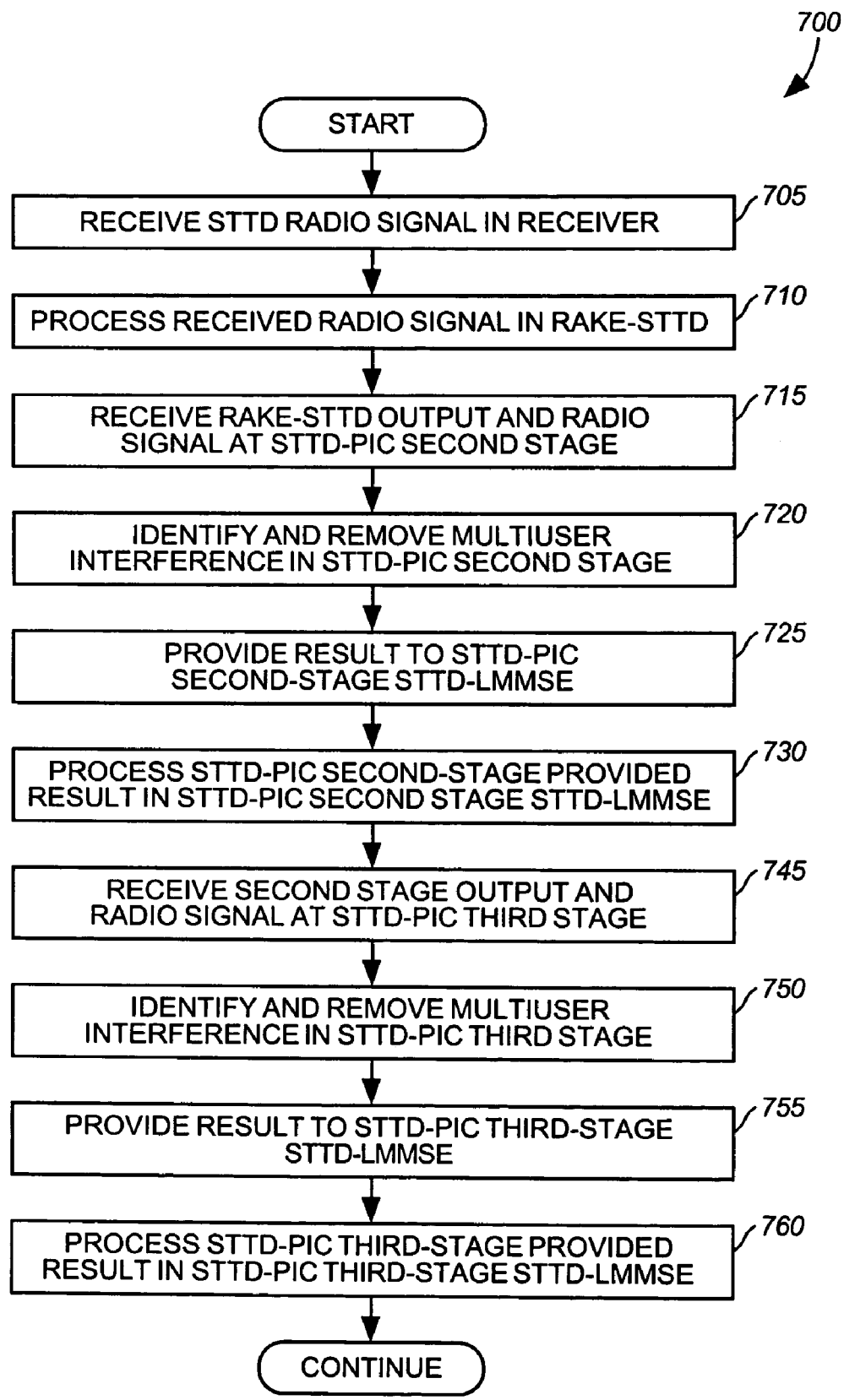
FIG. 7 is a flow chart illustrating a method of receiving and processing a radio signal according to an embodiment of the present invention.

FIG. 7 is a flow chart illustrating a method 700 of receiving a radio signal according to an embodiment of the present invention. Initially, (START), it is presumed that the receiver of FIG. 5 is being utilized; the operation of various other embodiments of the present invention should be apparent, however, in light of this disclosure and the accompanying drawings. The method begins when a radio signal is received at a receive filter (not shown in FIG. 5) of the receiver and then downsampled (steps not shown), resulting in a signal represented by a vector y. The downsampled signal y is then received at a first stage of the receiver (step 705), where it is processed using a RAKE-STTD receiver (step 710). The output û, d̂ (see FIG. 5) of the first stage is then received at the STTD-PIC second stage along with the downsampled signal y (step 715).

In the STTD-PIC second stage, multiuser interference is identified and subtracted from the signal (step 720), and the result provided to an STTD-LMMSE receiver incorporated within the STTD-PIC second stage (step 725) and processed to produce output $\hat{u}^{(2)}$, $\hat{d}^{(2)}$ (step 730). The STTD-LMMSE chip equalizer (filter) attempts to minimize the mean-squared error between the transmitted chip signal and the received LMMSE filtered signal. This is then received at the STTD-PIC third stage, which is provided with the downsampled signal y as well (step 745). There, as in the STTD-PIC second stage, multiuser interference is identified and subtracted from the signal (step 750), and the result provided to an STTD-LMMSE receiver incorporated within the STTD-PIC third stage (step 755). The third-stage STTD-LMMSE then processes the signal to produce output $\hat{u}^{(3)}$, $\hat{d}^{(3)}$ (step 760). This output is then provided to a decoder or, if present, a subsequent STTD-PIC stage or stages (step not shown).

The preferred descriptions are of preferred examples for implementing the invention, and the scope of the invention should not necessarily be limited by this description. Rather, the scope of the present invention is defined by the following claims.

What is claimed is:

1. In a radio receiver for use in a radio communication network, said receiver comprising:
    a first stage comprising a space-time transmit diversity-RAKE (STTD-RAKE) receiver for receiving and processing a radio signal from a transmitter that employs transmit diversity, and for producing an estimation of the radio signal as an output;
    a second stage for receiving the output of the first stage and processing it to further refine the estimation using STTD-parallel interference cancellation (STTD-PIC); and
    a third stage for receiving the output of the second stage and processing it to further refine the estimation using STTD-PIC;
    wherein at least one of the second stage or the third stage comprises an STTD-linear minimum mean square error (STTD-LMMSE) receiver.

2. The radio receiver of claim. 1, wherein the receiver is operable according to a code division multiple access (CDMA) standard.

3. The radio receiver of claim 1, wherein the second stage comprises an STTD-LMMSE receiver.

4. The radio receiver of claim 1, wherein the third stage comprises an STTD-LMMSE receiver.

5. The radio receiver of claim 1, wherein the second and the third stages each comprises an LMMSE receiver.

6. The radio receiver of claim 1, further comprising at least one stage that is subsequent to the third stage for receiving the output of the stage preceding it and processing it to further refine the estimation.

7. The radio receiver of claim 1, wherein the receiver also receives a pilot signal, wherein the second stage produces a refined estimation of the pilot signal.

8. The radio receiver of claim 7, wherein a plurality of stages that are subsequent to the first stage also each receive a pilot signal, and produce a further refined estimation of the pilot signal.

9. A system for wireless communication using a space-time transmit diversity (STTD), said system comprising:
    a transmitter operable for transmitting signals using STTD;
    a receiver for receiving the transmitted signals, wherein the receiver comprises:
        a first stage comprising a STTD-RAKE for processing the transmitted signals to produce an output; and
        a second stage comprising STTD-parallel interference cancellation (STTD-PIC) and STTD-linear minimum mean square error (STTD-LMMSE) for receiving the output of the first stage and processing it to produce an output.

10. The system of claim 9, further comprising an STTD-PIC third stage for receiving the output of the second stage and further processing it.

11. The system of claim 10, wherein the third stage further comprises an STTD-LMMSE.

12. The system of claim 9, wherein the second stage also processes the transmitted signals.

13. The system according to claim 9, wherein the system employs 2-1 diversity.

14. A method for processing a received space-time transmit diversity (STTD) radio signal carrying transmitted data, said method comprising the steps of:
    receiving indications of the received STTD radio signal in a first stage STTD-RAKE;
    processing the signal in the first stage to produce an estimate of the data as output;
    receiving as input in a second stage of the receiver the output of the first stage; and
    processing the input received in the second stage to produce a refined estimate of the data as output;
    wherein the second stage comprises STTD-parallel interference cancellation (STTD-PIC) and STTD-linear minimum mean square error (STTD-LMMSE).

15. The method of claim 14, further comprising the steps of:
    receiving as input in a third stage of the receiver the output of the second stage; and
    processing the input received in the third stage to produce a refined estimate of the data as output.

16. The method of claim 14, wherein the second stage also receives and processes the indications of the received STTD radio signal.

17. The method of claim 16, wherein the third stage also receives and processes the indications of the received STTD radio signal.

* * * * *